United States Patent [19]
Yasue et al.

[11] Patent Number: 5,858,230
[45] Date of Patent: Jan. 12, 1999

[54] HUB RING AND SUPPORTING PLATE FOR A FILTER

[75] Inventors: Syoichi Yasue, Minokamo; Keiichi Murakami, Funabashi, both of Japan

[73] Assignees: Nagase & Co. Ltd.; Kabushiki Kaisha Toukai Spring Seisakusho, both of Japan

[21] Appl. No.: 735,913

[22] Filed: Oct. 24, 1996

Related U.S. Application Data

[62] Division of Ser. No. 408,483, Mar. 22, 1995, Pat. No. 5,611,925.

[30] Foreign Application Priority Data

Mar. 23, 1994 [JP] Japan ............................... HEI-6-78111
Jul. 25, 1994 [JP] Japan ............................ HEI-6-192333

[51] Int. Cl.$^6$ .................................................. B01D 29/05
[52] U.S. Cl. ........................ 210/346; 210/486; 210/487; 210/488; 29/896.62
[58] Field of Search .................................. 210/346, 486, 210/487, 488; 29/896.6, 896.62

[56] References Cited

U.S. PATENT DOCUMENTS 2,263,853  11/1941  Re Qua .
4,876,007  10/1989  Naruo et al. .
5,055,192  10/1991  Artinyan et al. .

FOREIGN PATENT DOCUMENTS

| | | |
|---|---|---|
| 246114 | 7/1909 | Germany . |
| 387206 | 12/1923 | Germany . |
| 188335 | 1/1957 | Germany . |
| 1014523 | 8/1957 | Germany . |
| 91518 | 2/1938 | Sweden . |
| 178749 | 4/1962 | Sweden . |
| 238098 | 9/1945 | Switzerland . |

*Primary Examiner*—W. L. Walker
*Attorney, Agent, or Firm*—Austin R. Miller

[57] ABSTRACT

Disclosed is a hub ring for a filter wherein a supporting member having a plurality of supporting portions is interposed between a pair of keep plates, a supporting plate for a filter wherein a plurality of wave portions extending substantially in the circumferential direction are arranged in the radial direction, and methods for manufacturing these members. The hub ring has a great opening ratio to achieve a low pressure loss property and causes substantially no residence of polymer, and the hub ring can be manufactured at a low cost. The supporting plate has high pressure resistance, low-pressure loss property, good directivity of polymer flow and excellent polymer mixing effect, and it is suitable for use as a retainer disposed inside of a filter.

19 Claims, 15 Drawing Sheets

HUB RING AND SUPPORTING PLATE FOR A FILTER

This application is a divisional of application Ser. No 08/408,483, filed Mar. 22, 1995 U.S. Pat. No. 5,611,925.

BACKGROUND OF THE INVENTION

1. Field of the Invention

The present invention relates to a hub ring and a supporting plate for a filter and methods for manufacturing these members.

2. Description of the Related Art

Disc-type filters are known as filters for filtering a polymer, and for example, a so-called leaf disc-type filter and a three-layer type filter wherein disc-type filter materials are disposed on and under a retainer for forming a single filter element are well known. Such filters are usually used by stacking a plurality of filter elements by a number corresponding to a capacity of filtration to be required (flow rate of a molten polymer to be filtered). In the case of use of stacked filters, because it is necessary to seal a polymer after filtration from a polymer before filtration, a hub ring is provided on the inner circumference of each filter (as needed, it may be provided on the outer circumference of each filter). Such a hub ring seals polymers after and before filtration from each other and ensures a path for the polymer after filtration, as described above, as well as maintaining a positional relationship between respective stacked filters (for example, interval of filters).

As a typical structure of conventional filters, for example, a structure shown in FIG. 22 is known. FIG. 22 illustrates a part of an inner circumferential portion of a leaf disc-type filter 101. A filter medium 104 is provided on each side of a retainer 102 constructed from, for example, a mesh, via a filter medium supporting material 103 constructed from a perforated plate (for example, a punching metal). A hub ring 105 is provided on the circumference of filter 101, and a plurality of small holes 106 are provided in the hub ring 105. A molten polymer 107 flows into filter media 104 from upper and lower sides, and the polymer 107 filtered by the filter media 104 passes through a portion of retainer 102 and holes 106 of hub ring 105 to be gathered a central portion, as shown by the arrows in FIG. 22.

In a case where a plurality of filters 101 are stacked, a predetermined number of filters 101 are fitted and stacked around a tubular supporting pole 108, and the gap between filter media 104 of adjacent filters 101 is set based on the dimension of the portion of hub ring 105. Respective hub rings 105 of stacked filters 101 are pressed from upper or lower side by a great fastening pressure capable of sealing polymers after and before filtration from each other, for example, a pressure of 5–10 tons.

In such a conventional structure, there remain the following problems.

Firstly, although a number of small holes 106 are opened in hub ring 105 for passing a polymer after filtration, the opening ratio thereof is about 20% at highest, and the small opening ratio causes a large pressure loss generated at this portion. Although it may be considered to enlarge the diameter of the holes in order to increase the opening ratio, the enlargement of the hole diameter is restricted to some extent by the above-described great fastening pressure.

Moreover, in the above structure defining small holes, in the upstream side of the polymer flow, the portions around the small holes 106 are likely to create a large dead space against the polymer flow. Such a dead space causes residence of polymer, and the residence of polymer causes degradation of the polymer and flowing-out of the degraded polymer, and therefore it is desired to suppress such a dead space as small as possible.

Furthermore, since the small holes 106 must be processed in the radial direction of hub ring 105, the processing is relatively difficult and a long time is required for the processing. Therefore, the cost for manufacturing the hub ring 105 is relatively expensive.

Still further, for the retainer 102, a relatively high strength particularly against deformation of the retainer in the thickness direction thereof, for example, a pressure resistance of about or higher than 200 kg/cm$^2$, is usually required in order to maintain the form of the filter to an acceptable form and in order to ensure the polymer path in the radial direction of the filter at the position of the retainer. Even by the mesh type retainer 102, such a high strength for a high pressure resistance can be satisfied. In the mesh type retainer 102, however, particularly there are the following problems with respect to pressure loss and polymer residence.

Namely, in the mesh type retainer 102, because wires extending in the circumferential direction of the filter while waving (usually, the wire has a diameter corresponding to ½ of the thickness of the retainer 102 or a diameter slightly greater than that value) cause a large resistance against the polymer flow in the radial direction of the filter, it is difficult to suppress the pressure loss at the portion of the retainer 102, ultimately the pressure loss of the whole of the filter 101, to a small value.

Further, in the portion of the retainer 102, the polymer flows toward radially inner direction mainly along the wires extending in the radial direction of the filter. These wires extending in the radial direction of the filter form a dead volume against a polymer path rather than forming a polymer path, and therefore, the polymer flow has a poor directivity in the radial direction of the filter and it may be difficult to achieve a smooth polymer flow. The difficulty of a smooth polymer flow causes a poor chance of polymer mixing. Therefore, there is a latent problem that the polymer mixing effect (also called "static mixer effect") is small. Furthermore, there is a fear causing a problem of polymer residence. Also with the wires extending in the circumferential direction of the filter, there are similar problems because they form a dead volume against the polymer flow.

SUMMARY OF THE INVENTION

An object of the present invention is to provide a hub ring for a filter which can achieve a great opening ratio of a polymer path and an extremely low pressure loss, which hardly causes residence of polymer and which can be manufactured easily and inexpensively, and a method for manufacturing the same.

Another object of the present invention is to provide a supporting plate for a filter which has a high pressure resistance and can be easily formed as a shape causing a low pressure loss, which can easily provide a desired directivity to a polymer flow without causing residence of the polymer flow as well as can realize an excellent polymer mixing effect, and which is suitable for use as a retainer provided inside of a filter element, and a method for manufacturing the same.

A further object of the present invention is to realize a further low-pressure loss, high-pressure resistance and high-quality filter by combining the above-described hub ring and supporting plate.

To accomplish these objects, a hub ring according to the present invention is provided on at least one of inner and outer circumferences of a disc-type filter. The hub ring comprises: (a) a pair of keep plates disposed spacedly from each other and in parallel to each other, each of the pair of keep plates being formed as an annular plate; and (b) an annular supporting member disposed between the pair of keep plates. The supporting member has (i) a plurality of supporting portions disposed spacedly from each other in a circumferential direction of the hub ring, each of the plurality of supporting portions extending between the pair of keep plates in a direction substantially perpendicular to the pair of keep plates and extending in a radial direction of the hub ring and (ii) an annular plate portion connected to the plurality of supporting portions.

The annular plate portion of the annular supporting member may be connected to one of the inner and outer sides of the plurality of supporting portions in a radial direction of the hub ring for maintaining a desired arrangement of the plurality of supporting portions.

A method for manufacturing a hub ring according to the present invention is herein provided. The hub ring is provided on at least one of inner and outer circumferences of a disc-type filter. The method comprises the steps of:

(a) defining a plurality of slits on an annular plate at a position of one of inner and outer circumferential sides of the annular plate, the plurality of slits being arranged over the entire length of one of inner and outer circumferential sides of the annular plate, each of the plurality of slits extending in a radial direction of the annular plate;

(b) twisting portions positioned between respective adjacent slits substantially at an angle of 90 degrees relative to the annular plate for making an annular supporting member; and (c) disposing a pair of keep plates on and under the twisted portions of the annular supporting member, each of the pair of keep plates being formed as an annular plate.

Further, a method for manufacturing a hub ring for a filter according to the present invention comprises the steps of:

(a) defining a plurality of straight slits one side of the plate, the plurality of slits being arranged substantially over the entire length of the plate, each of the plurality of slits extending in a width direction of the plate;

(b) twisting portions positioned between respective adjacent slits and end portions positioned outside of both end slits substantially at an angle of 90 degrees relative to the plate;

(c) forming an annular supporting member by rounding the plate so as to arrange the twisted portions along one of inner and outer circumferences of the annular supporting member; and (d) disposing a pair of keep plates on and under the twisted portions of the annular supporting member, each of the pair of keep plates being formed as an annular plate.

Thus, the plurality of supporting portions are easily formed by twisting portions positioned between respective adjacent slits at an angle of 90 degrees. In order to easily perform this twisting and in order to provide a great pressure resistance to the formed supporting portions at a position between a pair of keep plates, the material of the annular supporting member is desired to be constructed from a stainless steel.

In such a hub ring for a filter, since a number of supporting portions extending substantially perpendicularly to a pair of keep plates are interposed between the pair of keep plates, spaces defined between respective adjacent supporting portions are formed as polymer paths for a polymer after filtration which extend in the radial direction of the filter. Further, in the area between a pair of keep plates, all the portions other than the supporting portions function as polymer path. Therefore, the opening ratio of the polymer path can be greatly increased as compared with the conventional structure provided with small holes and having a large dead space, and thereby greatly decreasing the pressure loss.

Further, the supporting portions extend substantially perpendicularly to a pair of keep plates and function as shorings against a compression load applied to the pair of keep plates. Therefore, they can indicate an extremely great pressure resistance as compared with a conventional member having waving wires, as long as buckling does not occur in the supporting portions. Because the dimension between the pair of keep plates is usually small and it is about 5 mm at largest, buckling does not occur in the supporting portions. As a result, even if a great compression load is applied to the pair of keep plates, that is, even if a fastening force is applied to respective hub rings in a filter stacking structure, each hub ring is not deformed and the above-described polymer path having a great opening ratio can be maintained in a desired condition with no trouble.

The annular plate portion is positioned at the inner circumferential side or outer circumferential side of the annularly arranged supporting portions. In this portion of the annular plate portion, the whole of the space between a pair of keep plates functions as a polymer path. Therefore, also in this portion, a great opening ratio of a polymer path is ensured, and the pressure loss can be suppressed.

Thus, the pressure loss can be extremely suppressed as the whole of the hub ring by the large opening ratio, and there is no portion causing residence of polymer in the polymer path in the hub ring and the whole of the polymer after filtration can pass smoothly through the hub ring.

Further, in the hub ring according to the present invention, a pair of keep plates each formed as an annular plate and the annular supporting member having supporting portions and an annular plate portion can be separately manufactured. The pair of keep plates can be easily made, and even the supporting member, as aforementioned, can be easily made by defining a plurality of slits extending in the radial direction on an annular plate at a position of one of the inner and outer circumferential sides of the annular plate and twisting portions between respective adjacent slits at an angle of 90 degrees. Further, the keep plates and the supporting member can be integrally formed, for example, by welding these members, thereby making a hub ring excellent in handling. Thus, not only respective members constituting a hub ring but also the hub ring itself can be manufactured extremely easily, and a large number of hub rings can be manufactured in a short period of time as well as the cost for manufacture can be greatly reduced as compared with that for the conventional hub rings.

A supporting plate for a filter according to the present invention is provided inside of a disc-type filter having filter media at surface portions thereof. The supporting plate comprises a plurality of wave portions each extending substantially in a circumferential direction of the filter and waving in a thickness direction of the filter. The plurality of wave portions are formed by pressing so as to be arranged substantially adjacent to each other in a radial direction of the filter.

In the supporting plate, a portion present between two wave portions adjacent to each other in the direction of said filter may remain as a portion which does not wave.

The form of each wave portion is not particularly restricted. For example, wave forms of two wave portions adjacent to each other among the plurality of wave portions may shift substantially by a ½ pitch of one of the wave forms in a circumferential direction of the filter, and may shift by ⅓ or ¼ pitch.

The wave forms of the plurality of wave portions may have substantially a constant pitch over the entire area in which the plurality of wave portions are formed. Alternatively, a pitch of a wave portion formed at a radially outer position and a pitch of a wave portion formed at a radially inner position may be different from each other. For example, a pitch in a radially inner portion may be smaller than a pitch in a radially outer portion or the pitch may be set so as to become gradually small toward the radially inner direction, or on the contrary, the pitch may be set so as to become gradually large toward the radially inner direction. The pitch of the wave forms is not particularly restricted, and it may be appropriately designed in accordance with, for example, a width of a single wave portion, easiness of pressing for forming the wave portions, or thickness and material of a annular plate prepared as a raw material plate for manufacturing a supporting plate to be pressed to wave portions.

For example, in a case where the raw material plate is a stainless steel having a thickness of 0.3 to 1.2 mm, the width of a single wave portion is preferably in the range of 0.5 to 4.0 mm, more preferably in the range of 1.0 to 3.0 mm, and the pitch of the wave form is preferably in the range of 2.0 to 8.0 mm, more preferably in the range of 3.0 to 6.0 mm.

The pattern for the wave portions can be freely designed as long as the above-described conditions are satisfied.

For example, the following structure can be employed. A first group of wave portions extending substantially straight in the circumferential direction of the filter at a constant angle relative to a radial direction of the filter within a first region of the supporting plate circumferentially divided at a predetermined circumferential angle, and a second group of wave portions extending substantially straight in the circumferential direction of the filter at the same angle as the constant angle relative to a radial direction of the filter within a second region of the supporting plate circumferentially divided at a predetermined circumferential angle which is adjacent to the first region in the circumferential direction of the filter.

Alternatively, the following structure can be employed. A first group of wave portions extending substantially straight in the circumferential direction of the filter at a constant angle relative to a radial direction of the filter within a first region of the supporting plate circumferentially divided at a predetermined circumferential angle, and a second group of wave portions extending substantially straight in the circumferential direction of the filter at an angle different from the constant angle relative to a radial direction of the filter within a second region of the supporting plate circumferentially divided at a predetermined circumferential angle which is adjacent to the first region in the circumferential direction of the filter.

Further, a structure, wherein the plurality of wave portions extend concentrically in the circumferential direction of the filter, can also be employed.

Furthermore, although it is preferred that the supporting plate is constructed as an integrally formed single annular member, it may be constructed from a plurality of members divided in the circumferential direction of the filter.

Although the material of the supporting plate is not particularly restricted as long as it is made from a metal capable of being pressed, particularly a stainless steel is preferred. By pressing a raw material of a stainless steel, work hardening can occur on the formed wave portions, thereby further increasing the pressure resistance thereof. Moreover, a stainless steel is preferred from the viewpoint of rustproofing. Although the wave portions can have a sufficiently high strength only by press forming even if there is a slight residual stress, it may be subjected to annealing at a low temperature after press forming in order to ensure a further high pressure resistance as needed. In the case of stainless steel, the low temperature annealing is performed preferably at a temperature of 410° to 440° C. Further, a precipitation hardening type stainless steel may be employed in order to increase the strength.

Another supporting plate for a filter according to the present invention comprises a base plate portion formed as an annular plate; and a plurality of riser piece portions disposed in radial and circumferential directions of the base plate portion. Each of the plurality of riser piece portions extends in a radial direction of the base plate portion and rises from upper and lower surfaces of the base plate portion in a direction perpendicular to the base plate portion by being twisted substantially at an angle of 90 degrees relative to the base plate portion.

In this supporting plate, in a case where the plurality of riser piece portions are disposed concentrically on the base plate portion and a ring portion of the base plate portion is formed at a position between radially adjacent rows of riser piece portions, the ring portion is preferably waved in a thickness direction of the base plate portion. In this case, it is preferred that the heights of the riser piece portions from the upper and lower surfaces of the base plate portion are substantially the same as the heights of a wave form of the ring portion from the upper and lower surfaces of the base plate portion. Further, this type of supporting plate is preferably constructed from a stainless steel.

The above-described supporting plates for a filter according to the present invention are disposed inside of a disc-type filter having filter media at both surfaces portions thereof, and can be used as a retainer which is a substitute for the retainer shown in FIG. 22 or as a filter media supporting and retainer material.

For example, in a case where a filter comprises filter media at surface portions, filter media supporting material positioned inside of the filter media and a retainer at an innermost position, the retainer may be constructed by the supporting plate according to the present invention. Alternatively, in a case where a filter comprises filter media at surface portions and a filter media supporting and retainer material disposed inside of the filter, this filter media supporting and retainer material may be constructed by the supporting plate according to the present invention.

Further, the supporting plate according to the present invention can be applied together with the aforementioned specified hub ring for a filter which can realize a large opening ratio of a polymer path and a extremely low pressure loss, in which residence of polymer hardly occurs and which can be manufactured easily and inexpensively. By this combination, a filter having properties of further low pressure loss, high pressure resistance and high performance can be realized.

Namely, in an assembly of a supporting plate and a hub ring for a filter according to the present invention, a supporting plate is provided inside of a disc-type filter having filter media at surface portions thereof and a hub ring is provided on at least one of inner and outer circumferences of the disc-type filter. The assembly is characterized in that the supporting plate comprises a plurality of wave portions each extending substantially in a circumferential direction of the filter and waving in a thickness direction of the filter, the plurality of wave portions being formed by pressing so as to be arranged substantially adjacent to each other in a radial direction of the filter, and the hub ring comprises:

(a) a pair of keep plates disposed spacedly from each other and in parallel to each other, each of the pair of keep plates being formed as an annular plate; and (b) an annular supporting member disposed between the pair of keep plates, the supporting member having (i) a plurality of supporting portions disposed spacedly from each other in a circumferential direction of the hub ring, each of the plurality of supporting portions extending between the pair of keep plates in a direction substantially perpendicular to the pair of keep plates and extending in a radial direction of the hub ring and (ii) an annular plate portion connected to the plurality of supporting portions.

Another assembly of a supporting plate and a hub ring for a filter according to the present invention is characterized in that the supporting plate comprises:

a base plate portion formed as an annular plate: and a plurality of riser piece portions disposed in radial and circumferential directions of the base plate portion, each of the plurality of riser piece portions extending in a radial direction of the base plate portion and rising from upper and lower surfaces of the base plate portion in a direction perpendicular to the base plate portion by being twisted substantially at an angle of 90 degrees relative to the base plate portion, and the hub ring comprises:

(a) a pair of keep plates disposed spacedly from each other and in parallel to each other, each of the pair of keep plates being formed as an annular plate; and (b) an annular supporting member disposed between the pair of keep plates, the supporting member having (i) a plurality of supporting portions disposed spacedly from each other in a circumferential direction of the hub ring, each of the plurality of supporting portions extending between the pair of keep plates in a direction substantially perpendicular to the pair of keep plates and extending in a radial direction of the hub ring and (ii) an annular plate portion connected to the plurality of supporting portions.

In both the assemblies, the annular supporting member can be formed integrally with the supporting plate. However, the supporting plate and the hub ring may be formed separately, and both members may be applied together.

A method for manufacturing a supporting plate provided inside of a disc-type filter having filter media at surface portions thereof, according to the present invention, comprises the steps of preparing an annular plate; and forming a plurality of wave portions on the annular plate by pressing, each of the plurality of wave portions extending substantially in a circumferential direction of the annular plate and waving in a thickness direction of the annular plate, the plurality of wave portions being arranged substantially adjacent to each other in a radial direction of the annular plate.

In this method, a first group of wave portions is formed by pressing on a first region of the annular plate circumferentially divided at a predetermined circumferential angle. Then, a second group of wave portions is formed by pressing on a second region of the annular plate adjacent to the first region in the same pattern as that in the first region, and by repeating these operations of pressing, a plurality of wave portions are formed substantially over the entire circumference of the annular plate. Alternatively, the plurality of wave portions are formed by pressing, using a plurality of annular dies having diameters different from each other. Further, although the above-described wave portions can be formed only by pressing, a method may be employed wherein a plurality of slits are defined intermittently in the circumferential and radial directions of the annular plate, and portions between respective pairs of slits are formed as the wave portions by pressing.

Another method for manufacturing a supporting plate provided inside of a disc-type filter having filter media at surface portions thereof, according to the present invention, comprises the steps of defining a plurality of slits or slots on an annular plate, each of the plurality of slits or slots extending in a radial direction of the annular plate, the plurality of slits or slots being disposed in the circumferential direction of the annular plate as well as disposed in the radial direction of the annular plate in forms of a plurality of annular rows; and forming a plurality of riser piece portions rising from upper and lower surfaces of a base plate portion of the annular plate in a direction perpendicular to the base plate portion by twisting respective portions present between respective pairs of the slits or slots substantially at an angle of 90 degrees relative to the base plate portion.

In this method, it is preferred that each of the slots is formed as a slot having circular holes at both end portions in its longitudinal direction and the circular holes have a diameter greater than a width of a central portion of the slot.

In the above-described supporting plate wherein a plurality of wave portions each extending substantially in a circumferential direction of the filter and waving in a thickness direction of the filter and the plurality of wave portions are formed by pressing so as to be arranged substantially adjacent to each other in a radial direction of the filter, because the wave portions are formed by pressing, adjacent wave portions are connected to each other via original raw material (an annular plate) at any portion. Therefore, even if a plurality of wave portions are disposed so as to be adjacent to each other, the supporting plate can be maintained as a form of a single plate. Since the wave portions have a waving structure in the thickness direction of the filter and a plurality of wave portions having the waving structure are arranged adjacent to each other, fluid paths extending in the radial direction of the filter are formed by the waving structure portions disposed adjacent to each other.

For example, in a case where wave forms of two wave portions adjacent to each other shift substantially by a ½ pitch of one of the wave forms in a circumferential direction of the filter, a concave portion of a wave form of one wave portion is positioned at a position corresponding to a convex portion of a wave form of the other wave portion located radially adjacent, and a convex portion of a wave form of one wave portion is positioned at a position corresponding to a concave portion of a wave form of the other wave portion located radially adjacent. As viewed in the radial direction of the filter with respect to a plurality of wave portions, the convex portions and the concave portions are alternately positioned. As a result, the convex portions and the concave portions adjacent to each other can form a pipe-like fluid path. Since this pipe-like fluid path extends in the radial direction of the filter, only by forming a plurality of wave portions by pressing, can a plurality of fluid paths extending radially in the radial direction of the filter be formed efficiently.

Further, in a case where wave forms of two wave portions adjacent to each other shift by ⅓ or ¼ pitch of one of the wave forms in a circumferential direction of the filter, the fluid paths are formed in a condition where concave portions and convex portions of the respective wave forms of the plurality of wave portions are offset from each other in the circumferential direction of the filter. In such a structure, the plurality of fluid paths extending radially in the radial direction of the filter are formed as fluid paths being complicatedly bent or being complicatedly communicated with each other, and an excellent fluid mixing effect can be expected.

Since the fluid paths as described above are formed by providing convexe and concave portions to an annular raw material plate by pressing, an obstruction against the flow in the radial direction of the filter is caused only by the portions having the thickness of the plate. Therefore, a large obstruction such as that due to wires in the conventional structure does not occur, and the pressure loss of the fluid flow in the radial direction can be suppressed.

Further, the convex portions of the plurality of wave portions disposed adjacent to each other are arranged in a pattern of a staggered form. The convex portions arranged in such a staggered form can indicate an extremely high resistance against a pressure applied to upper and lower surfaces of the supporting plate. Therefore, the supporting plate for a filter according to the present invention can have an extremely high pressure resistance.

Furthermore, the fluid paths radially extending, which are formed a described above, communicate with each other, and the fluid can freely flow between adjacent fluid paths. As a result, naturally an extremely excellent static mixer effect can be obtained, and a uniformly mixed fluid flows in the radial direction of the filter and is gathered.

By applying such a supporting plate for a filter according to the present invention as a retainer provided inside of a filter element or a filter media supporting and retainer material, a filter having an excellent polymer mixing effect and indicating a low pressure loss and a high pressure resistance can be realized.

Further, a more high-performance filter can be obtained by combining such a supporting plate according to the present invention with the aforementioned specified structure of a hub ring.

Furthermore, in a type of supporting plate for a filter wherein a plurality of riser piece portions are disposed in radial and circumferential directions of a base plate portion, each of the plurality of riser piece portions extend in a radial direction of the base plate portion and rise from upper and lower surfaces of the base plate portion in a direction perpendicular to the base plate portion by being twisted substantially at an angle of 90 degrees relative to the base plate portion, the riser piece portions indicate substantially the same function as that of the wave portions of the above-described supporting plate. Therefore, also in this type of supporting plate, a filter having an excellent fluid mixing effect and indicating a low pressure loss against a radial flow and a high pressure resistance against a pressure applied from upper and lower sides can be realized.

Further objects, features, and advantages of the present invention will be understood from the detailed description of the preferred embodiments of the present invention with reference to the appropriate figures.

BRIEF DESCRIPTION OF THE DRAWINGS

Some preferred exemplary embodiments of the invention will now be described with reference to the appropriate figures, which are given by way of example only, and are not intended to limit the present invention.

DETAILED DESCRIPTION OF THE PREFERRED EMBODIMENTS

Firstly, preferred embodiments of hub rings for a filter according to the present invention will be explained with reference to the drawings.

Figure 1:
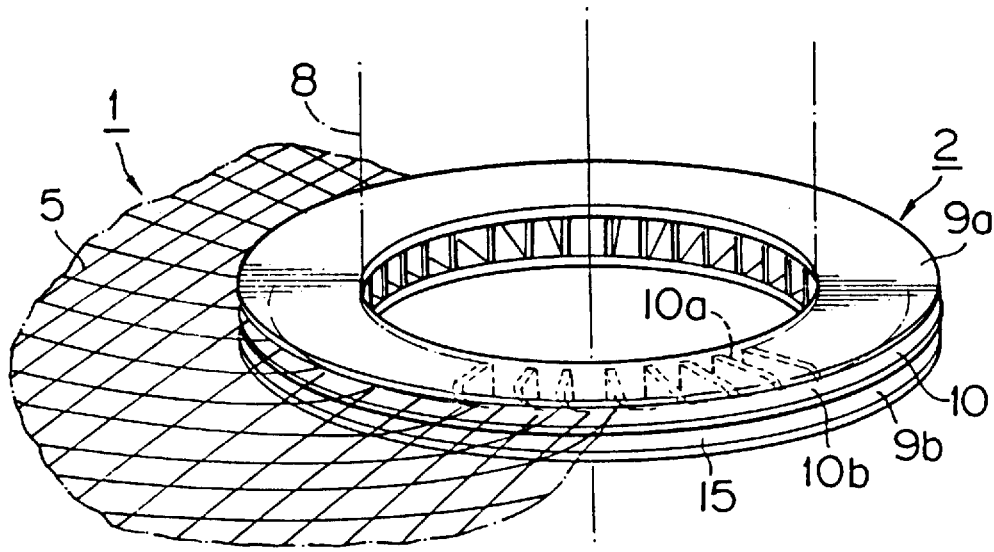
FIG. 1 is a partial perspective view of a filter using a hub ring according to an embodiment of the present invention.
Figure 2:
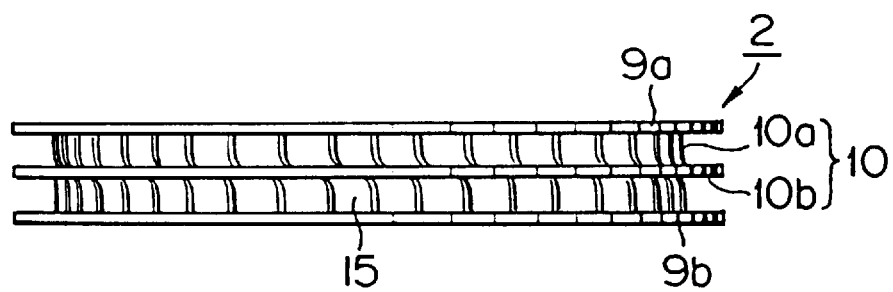
FIG. 2 is an elevational view of the hub ring shown in FIG. 1.
Figure 3:
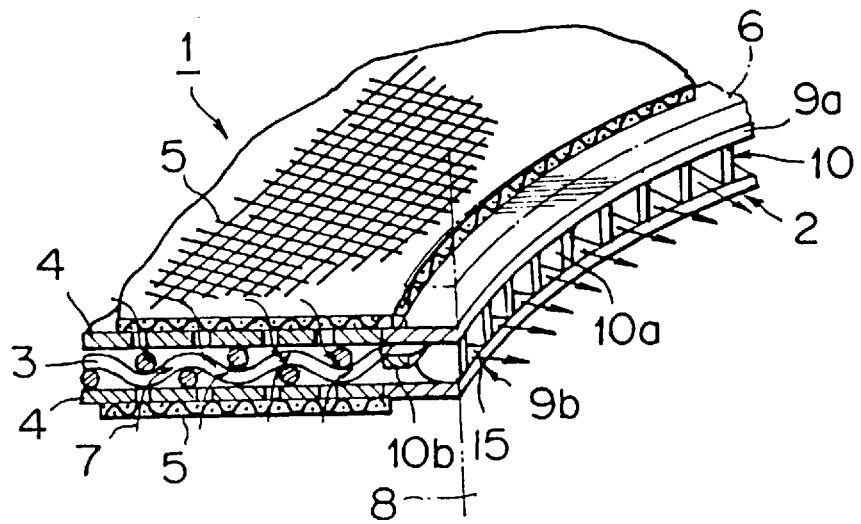
FIG. 3 is an enlarged, partial perspective view of the filter shown in FIG. 1.

FIGS. 1 to 5 show a hub ring for a filter according to an embodiment of the present invention. In FIGS. 1 to 3, label 1 shows the whole of a leaf disc-type filter, and the figures show a hub ring 2 and the vicinity. Filter 1 comprises a retainer 3 disposed in the central portion in the thickness direction, perforated plates 4 disposed on both surfaces of retainer 3, filter media 5 disposed outside of both perforated plates 4 and hub ring 2 disposed on the inner circumference of filter 1. In a case where a predetermined number of filters 1 are stacked, in order to define a predetermined gap (polymer path) between respective filters 1, in this embodiment, spacers 6 each having a predetermined thickness and constructed as a ring member are disposed between respective hub rings 2. As shown by arrows, a molten polymer 7 to be filtered passes through perforated plates 4 and retainer 3 after filtered by filter media 5, and after passes through hub ring 2, it is gathered into a supporting pole 8 disposed at the central position of stacked filters 1. The gathered polymer is sent to a next process. In this embodiment, although spacer 6 is made as a member separate from hub ring 2, it may be formed integrally with hub ring 2. Further, the structure of the hub ring according to the present invention can be applied to a structure wherein a hub ring is disposed on the outer circumference of a filter.

Figure 4:
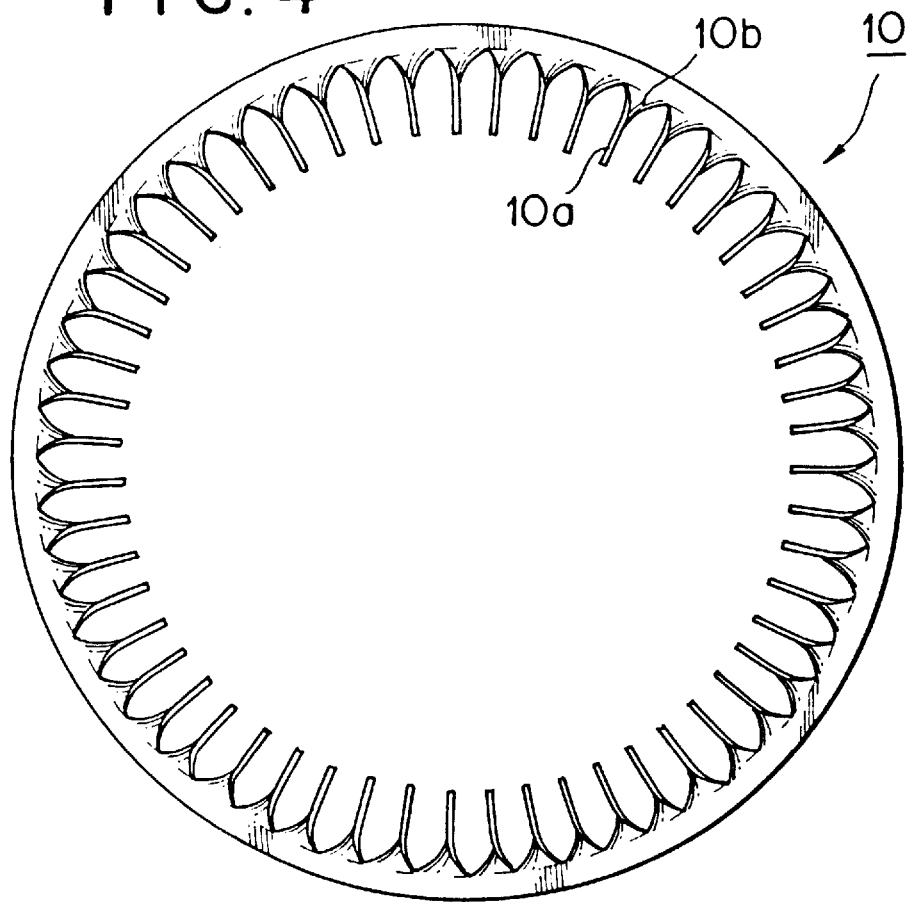
FIG. 4 is a plan view of an annular supporting member of the hub ring shown in FIG. 1.
Figure 5:
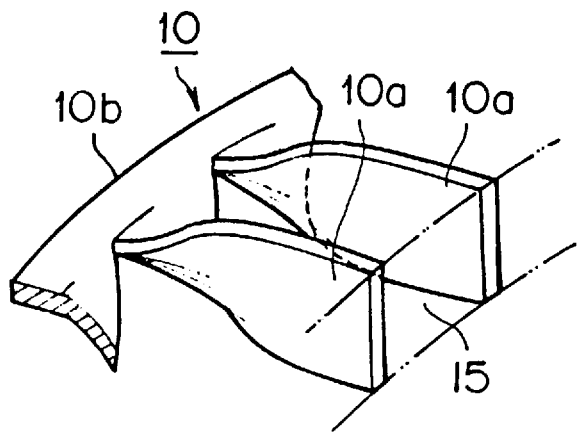
FIG. 5 is an enlarged, partial perspective view of the supporting member shown in FIG. 4.

Hub ring 2 comprises a pair of keep plates 9a and 9b disposed spacedly from each other and in parallel to each other each of which is formed as an annular plate, and an annular supporting member 10 disposed between the pair of keep plates 9a and 9b. In supporting member 10, also as shown in FIGS. 4 and 5, a plurality of supporting portions 10a are disposed spacedly from each other in a circumferential direction of hub ring 2, each of the plurality of supporting portions 10a extends between the pair of keep plates 9a and 9b in a direction substantially perpendicular to the pair of keep plates 9a and 9b and extends in a radial direction of the hub ring 2. The plurality of supporting portions 10a are connected to an annular plate portion 10b at a position of radially outer side of the hub ring 2.

The above-described plurality of supporting portions 10a can be formed, for example, by the following method.

Figure 6:
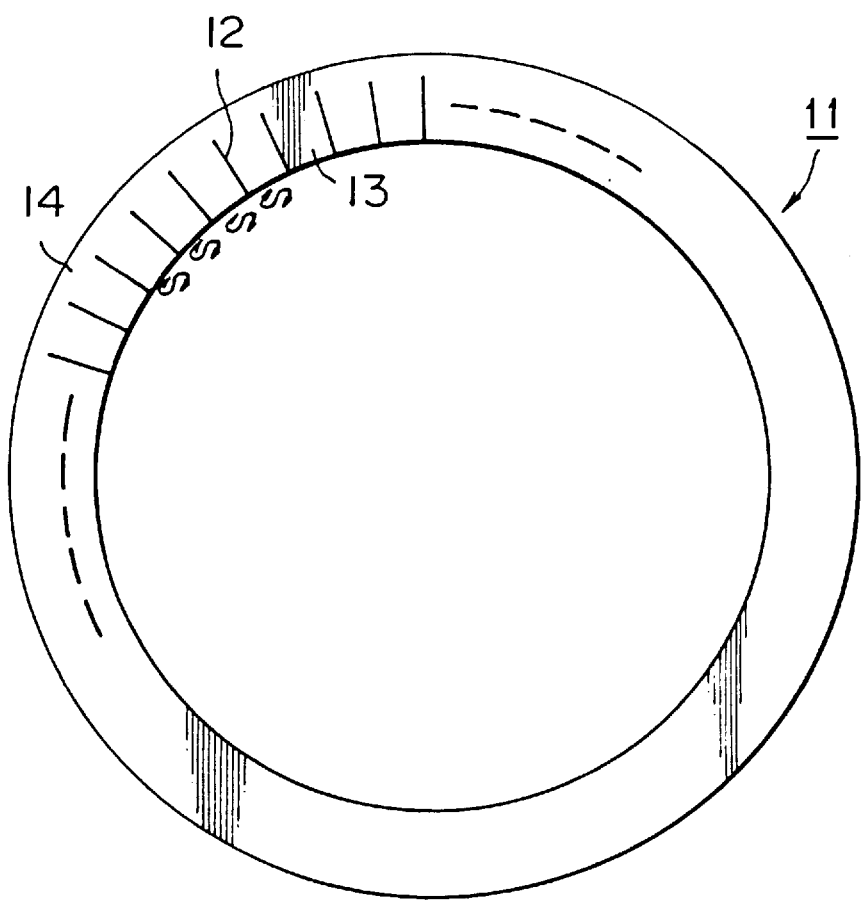
FIG. 6 is a plan view of the supporting member shown in FIG. 4, showing a state during processing.

As shown in FIG. 6, a plurality of slits 12 extending in a radial direction are defined at a predetermined pitch on the inner circumferential portion of an annular plate 11 having a predetermined thickness and prepared as a raw material plate, and portions 13 positioned between respective slits 12 are twisted at an angle of 90 degrees in the same direction by using an appropriate jig (not shown). At that time, an annular portion 14 in which slits are not defined are positioned just at a central portion of the portion 13 twisted at an angle of 90 degrees. By this, the respective portions 13 twisted at an angle of 90 degrees are adjusted at a same level relative to the annular portion 14. These portions 13 twisted at an angle of 90 degrees form the above-described plurality of supporting portions 10a and the annular portion 14 in which slits are not defined forms the above-described annular plate portion 10b.

Such a processing can be easily performed, for example, by constituting the annular plate 11 prepared as a raw material plate from stainless steel having a thickness of about 1 mm. In stainless steel, generally work hardening can be expected and, therefore, a great stiffness against bending and buckling caused by a compressed load can be provided to the supporting portions 10a formed by being twisted at an angle of 90 degrees. In particular, if the member is constructed from a cold-rolled stainless steel such as "CSPH" material, great work hardening can be expected and an extremely great stiffness can be provided. In such a stainless steel, even if the thickness of the plate is about 0.6 mm, a strength sufficiently resistant against a fastening force in the case of stacked filters or a compressed load due to polymer pressure, that is, a high strength causing no deformation when applied with such a load can be provided. Further, in a case where a high-strength material such as "CSPH" material is used, it is possible that an appropriate width is provided to the slit itself (that is, a stripe portion having an appropriate width is cut away from the material), the pitch of arrangement of the portions between the slits is enlarged and the pitch of respective supporting portions formed by being twisted at an angle of 90 degrees is enlarged. In the case of a high-strength material, even if the pitch of arrangement of supporting portions is relatively large, a sufficiently great pressure resistance can be provided.

In the above-described hub ring for a filter, the molten polymer 7 is filtered by filter media 5, flows into hub ring 2 through the portion of retainer 3, and is gathered in supporting pole 8 through a polymer path 15 formed between a pair of keep plates 9a and 9b. Firstly, when the portion arranged with supporting portions 10a is viewed in the portion between keep plates 9a and 9b, the spaces other than supporting portions 10a in this portion are all formed as the polymer path 15. Therefore, an extremely great opening ratio can be obtained as compared with the conventional structure with small holes. This opening ratio is determined from the thickness and pitch of supporting portions 10a and the diameter at a position of radially inner edge of the arrangement of the supporting portions 10a. Although hub ring 2 must be designed so as to have a sufficient strength against deformation in consideration of a compression load applied to keep plates 9a and 9b, that is, a fastening load applied to the hub ring 2 in a case where a plurality of filters 1 are stacked, in the present invention, while a sufficiently high strength against deformation even against a total fastening load higher than 10 tons can be provided, an opening ratio greater than 40%, preferably greater than 45%, can be easily provided.

For example, in the supporting member 10 shown in FIG. 4, because the thickness of supporting portion 10a is 1 mm and the pitch of the arrangement of the supporting portions 10a is 2.5 mm, a great opening ratio of about 71% can be realized. If the pitch of supporting portions 10a is maintained as it is and the thickness of supporting portion 10a is changed to 0.6 mm, an extremely great opening ratio of about 83% can be realized.

In the portion where annular plate portion 10b is positioned, although the annular plate portion 10b blocks a part of polymer path 15 as shown in FIG. 2, because a plate merely extending annularly is only interposed in the polymer path 15, it does not cause a great resistance against the polymer flow, and even in this portion, a great opening ratio can be easily ensured.

For example, when the gap between a pair of keep plates 9a and 9b is 2.5 mm and the thickness of annular plate portion 10b is 1 mm, a great opening ratio of 60% can be realized. When the thickness of annular plate portion 10b is 0.6 mm, an extremely great opening ratio of 76% can be realized.

The pressure loss when the polymer passes can be greatly reduced by such a great opening ratio. Usually, in a filter apparatus, the life of a filter is determined by a rise of a filtration pressure (pressure at entrance of filter media) due to clogging of filter media, and when the filtration pressure reaches a predetermined upper limit, the filter is exchanged. As described above, if the opening ratio is increased and the pressure loss at a position of the hub ring is greatly reduced, an initial filtration pressure is extremely reduced, the time available for use of the filter until reaching the above-described upper limit is increased (that is, the cumulative total amount of the passing polymer is increased) and the life of the filter can be greatly extended.

Further, since supporting portions 10a extend perpendicularly to keep plates 9a and 9b and they receive a load applied between the keep plates 9a and 9b most efficiently, they indicate a great pressure resistance. Therefore, it becomes structurally possible to design them so that they can easily indicate a great pressure resistance against a fastening force greater than 10 tons. Further, if supporting member 10 is constructed from a stainless steel as in this embodiment, when supporting portions 10a are formed in the supporting member 10 as aforementioned, a particular work hardening of the stainless steel occurs and the pressure resistance can be further increased.

Moreover, since the opening ratio can be designed to be great as aforementioned, there is no portion causing a polymer residence over the entire area of the polymer path 15 of the hub ring 2. Namely, the whole amount of polymer can be smoothly passed through the polymer path 15 of the hub ring 2. Because there occurs no polymer residence, degraded polymer is not generated, a defect in a product such as a fish eye caused by flowing-out of the degraded polymer can be prevented as well as troubles in manufacture of the product due to flowing-out of the degraded polymer can be prevented.

Furthermore, in the hub ring 2 according to the present invention, the method for manufacturing it can also be greatly simplified and facilitated as compared with that in the conventional hub ring. Namely, in the hub ring 2 according to the present invention, keep plates 9a and 9b and supporting member 10 can be processed separately, the keep plates 9a and 9b, of course, can be easily manufactured at a large scale as well as, even in supporting member 10, as shown in FIG. 6, because merely the processing for defining slits 12 on the annular plate and the processing for twisting the portions 13 between the slits 12 at an angle of 90 degrees may be performed, it can be easily processed as compared with the conventional structure having small holes. By combining these members, a desired hub ring 2 can be easily completed. Therefore, the hub ring 2 can be manufactured easily, in a short period of time and inexpensively in a simple process.

Figure 7:
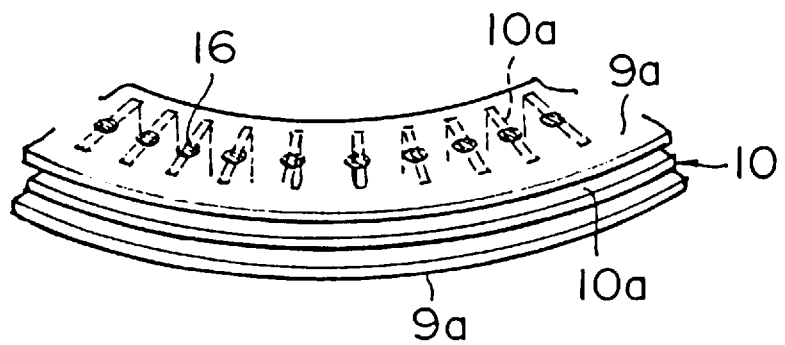
FIG. 7 is a partial perspective view of a hub ring according to another embodiment of the present invention.

When the pair of keep plates 9a and 9b and the supporting member 10 are assembled, for example, as shown in FIG. 7, these members may be fixed to each other at a predetermined positional relationship by welding such as spot welding (welded portion 16). Thus, the hub ring 2 can be formed as an integrally formed part, and the handling thereof can be greatly improved.

Figure 8:
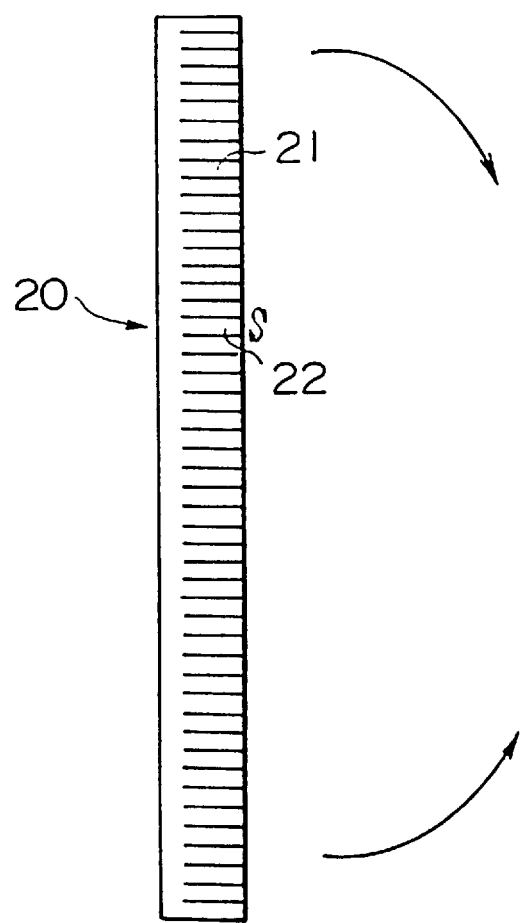
FIG. 8 is a plan view of a raw material showing a method for processing a supporting member different from the method shown in FIG. 6.

Further, although a method for manufacturing a supporting member 10 using an annular plate as a raw material plate has been explained in the above-described embodiment, other methods may be employed. For example, as shown in FIG. 8, a plurality of slits 21 are defined on a straight plate 20 formed in a stripe-like shape, the portions positioned between the slits 21 and the end portions positioned outside of both end slits 21 are twisted at an angle of 90 degrees to form supporting portions, and thereafter, as shown by arrows, the plate member is bent to form a annular plate by bending in order to manufacture a supporting member substantially the supporting member as that shown in FIG. 4.

Figure 9:
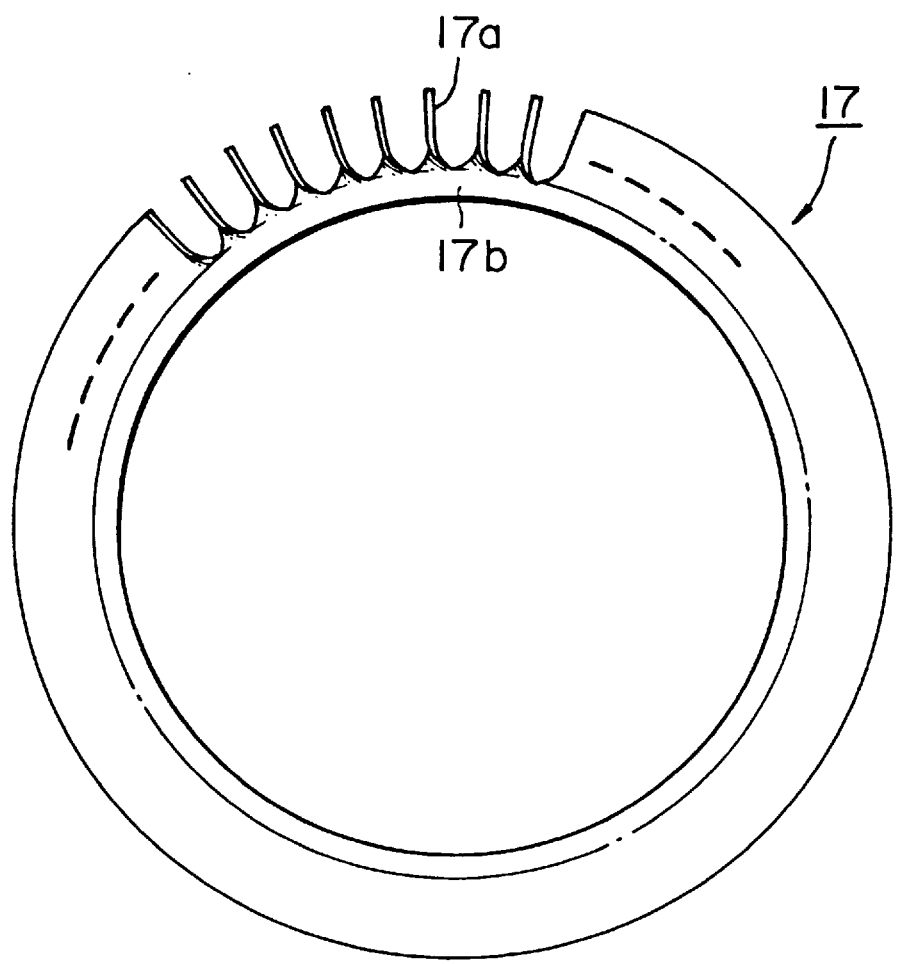
FIG. 9 is a plan view of a supporting member in which an annular plate portion is positioned at the inner circumference side of a supporting portion arrangement.

Furthermore, although the annular plate portion 10b is disposed on the outer circumferential side of the arrangement of supporting portions 10a in the above-described embodiment, this annular plate portion 10b may be disposed on the inner circumferential side of the arrangement of the supporting portions 10a. For example, in a supporting member 17 shown in FIG. 9, an annular plate portion 17b is disposed on the inner circumferential side of the arrangement of supporting portions 17a formed by twisting at an angle of 90 degrees.

Next, a supporting plate for a filter according to the present invention will be explained with reference to the drawings together with a method for manufacturing the same.

Figure 10:
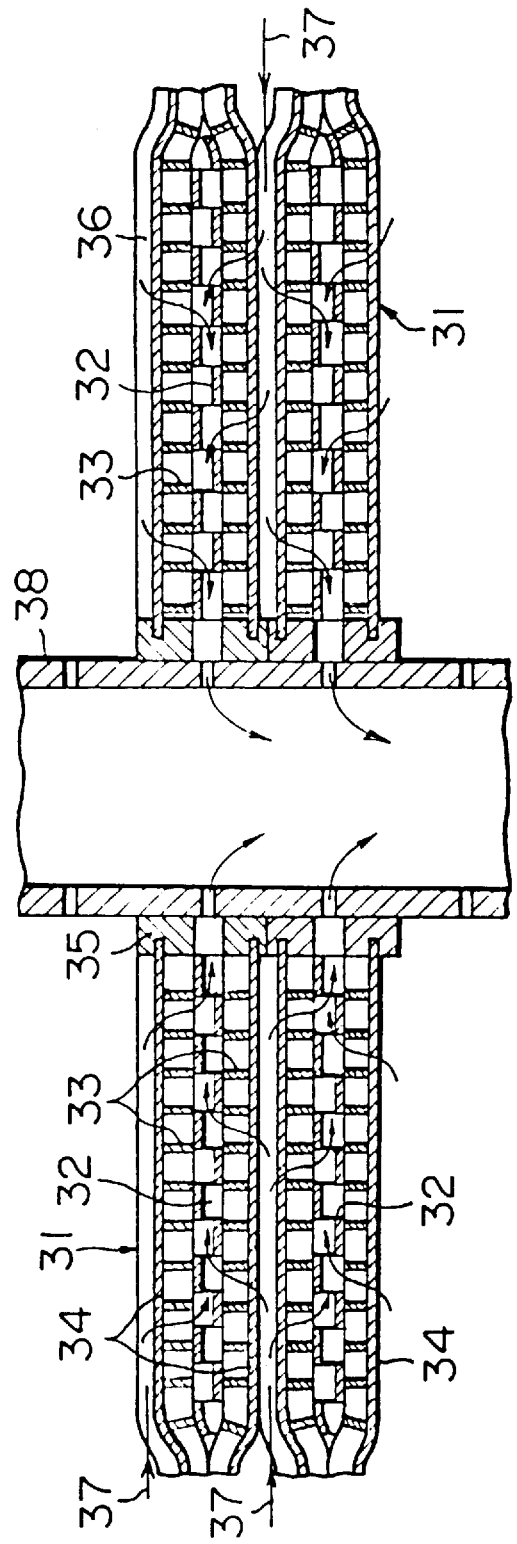
FIG. 10 is a partial, vertical sectional view of a filter apparatus using a supporting plate for a filter according to an embodiment of the present invention.
Figure 11:
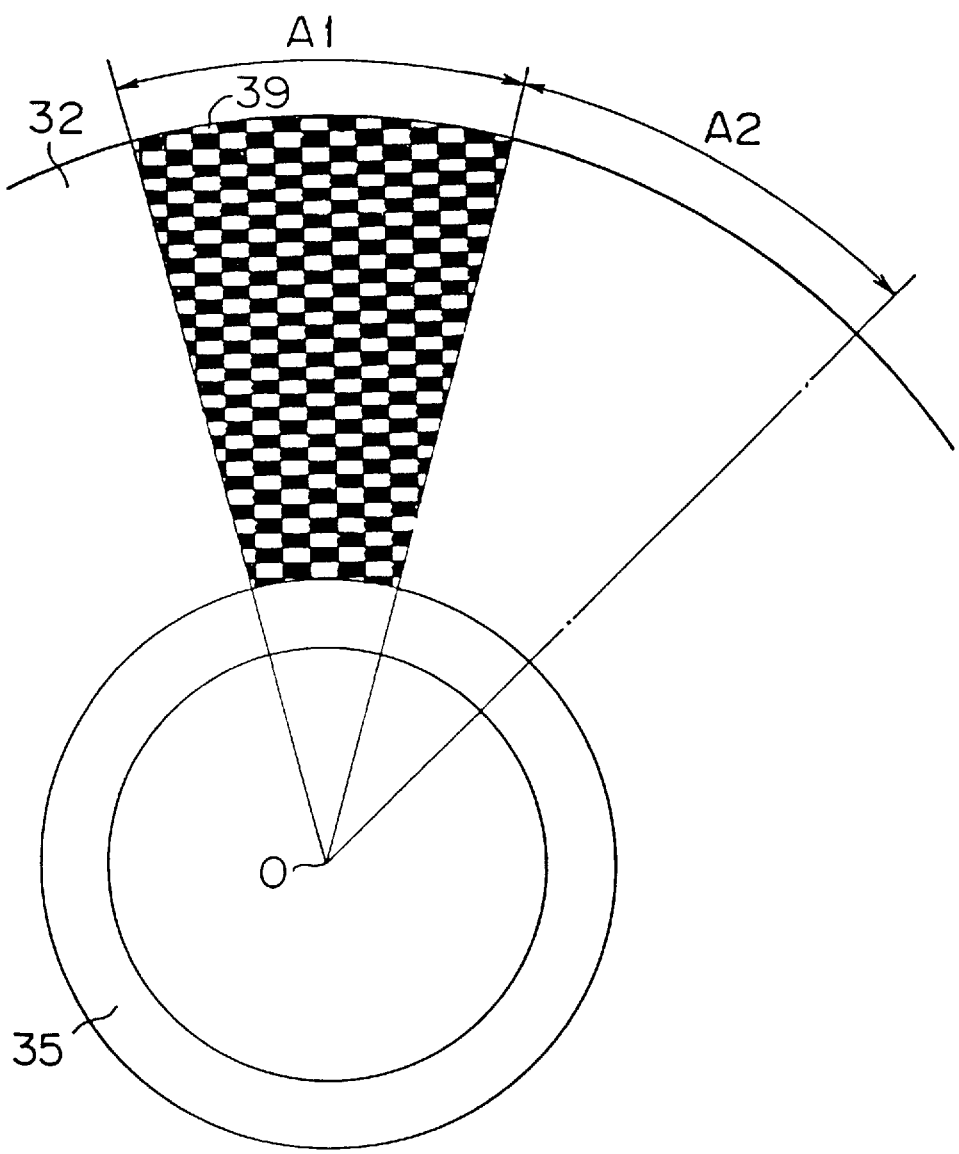
FIG. 11 is a partial plan view of a supporting plate according to the present invention, showing an example of a pattern of wave portions.
Figure 12:
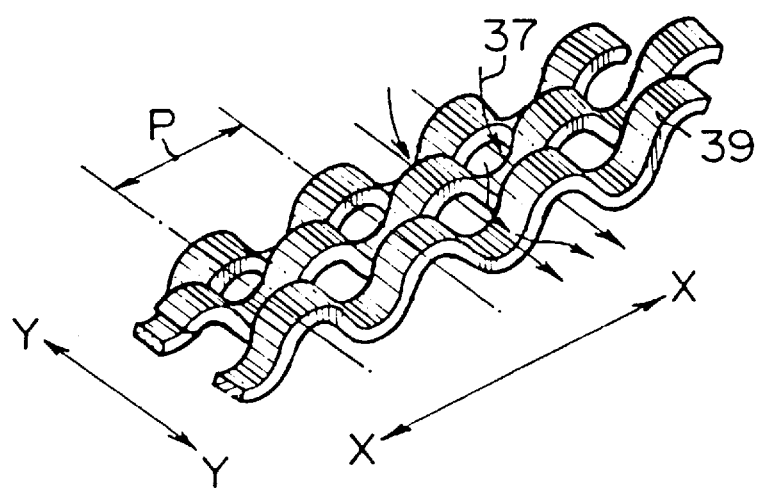
FIG. 12 is a partial perspective view of the wave portions.

FIGS. 10 to 12 illustrate a supporting plate for a filter according to an embodiment of the present invention and a filter element using the supporting plate. In FIG. 10, label 10 indicates the whole of a leaf disc-type filter element. Filter element 31 comprises a retainer 32 disposed at a central position in the thickness direction of the filter element, perforated plates 33 disposed on both surfaces of the retainer 32 as filter media supporting material, filter media 34 disposed outside of the respective perforated plates 33 and a hub ring 35 disposed on the inner circumference of the filter element 31. In a case where a plurality of filter elements 31 are stacked by a predetermined number, in this embodiment, spacers 36 having a predetermined thickness and formed as a member radially extending are disposed between respective adjacent filter elements 31 in order to ensure polymer paths between the respective adjacent filter elements 31. The molten polymer 37 to be filtered, as shown by arrows, is filtered by filter media 34. It then passes through perforated plates 33 and the portion of retainer 32, and it is gathered in a central supporting pole 38 after passing hub ring 35, and thereafter, it is sent to a next process. Although the spacers 36 are provided as separate members in this embodiment, hub ring 35 may be constituted as a member having the spacer function.

In this embodiment, the retainer 32 is constructed as a supporting plate for a filter according to the present invention. FIG. 11 shows a pattern of pressing for the retainer 32 (supporting plate for a filter) and FIG. 12 shows an enlarged part of the supporting plate 32 pressed to a structure having wave forms, respectively.

Figure 13:
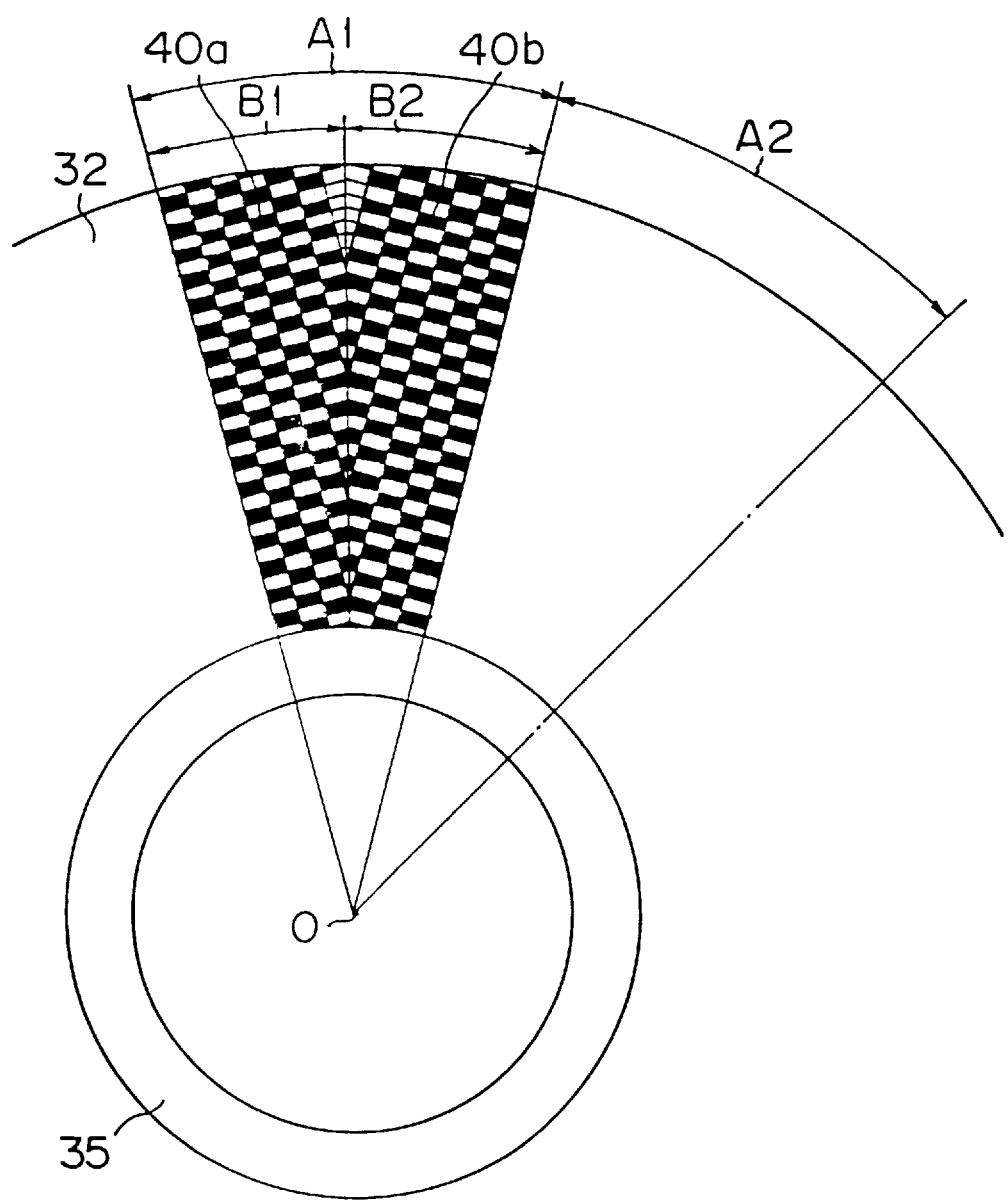
FIG. 13 is a partial plan view of a supporting plate according to the present invention, showing another example of a pattern of wave portions.
Figure 14:
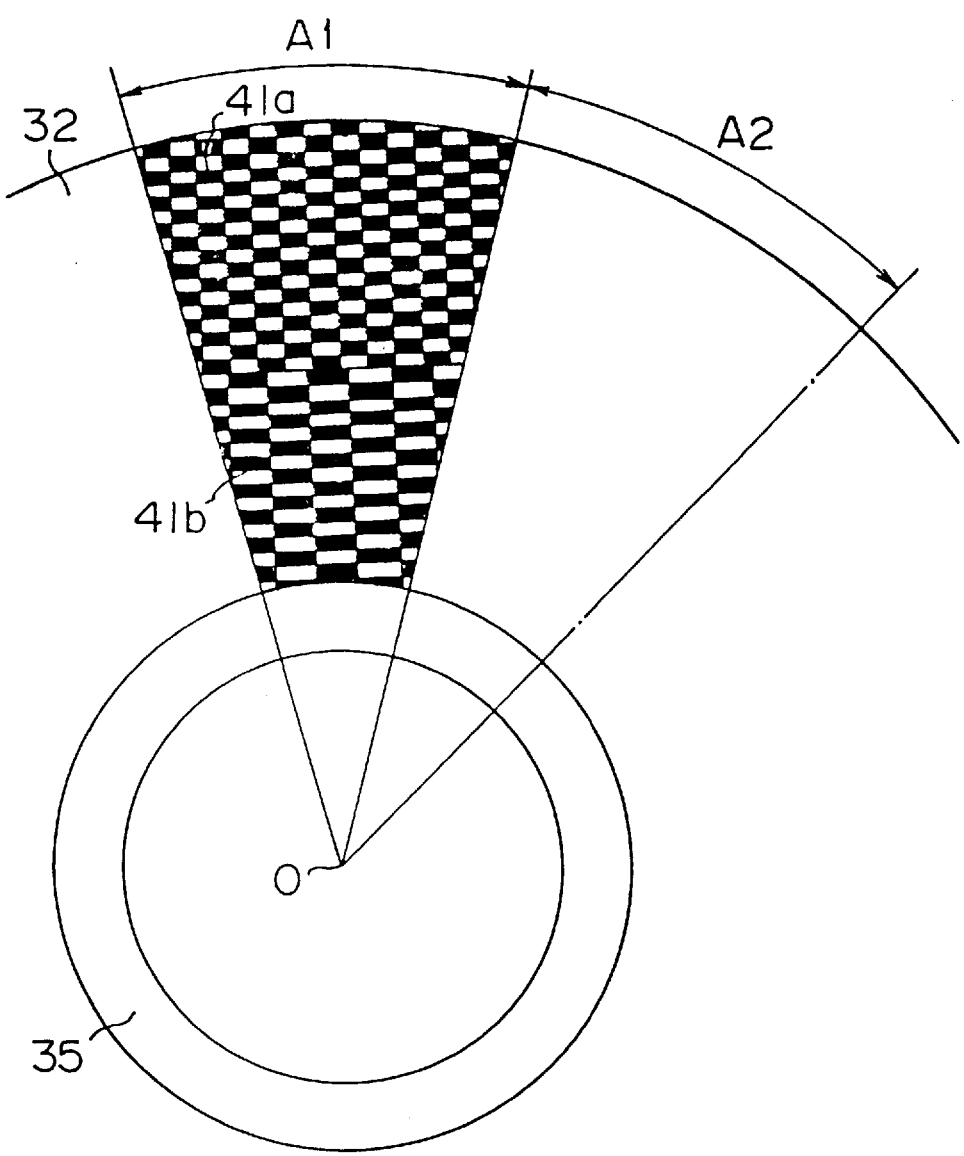
FIG. 14 is a partial plan view of a supporting plate according to the present invention, showing a further example of a pattern of wave portions.
Figure 15:
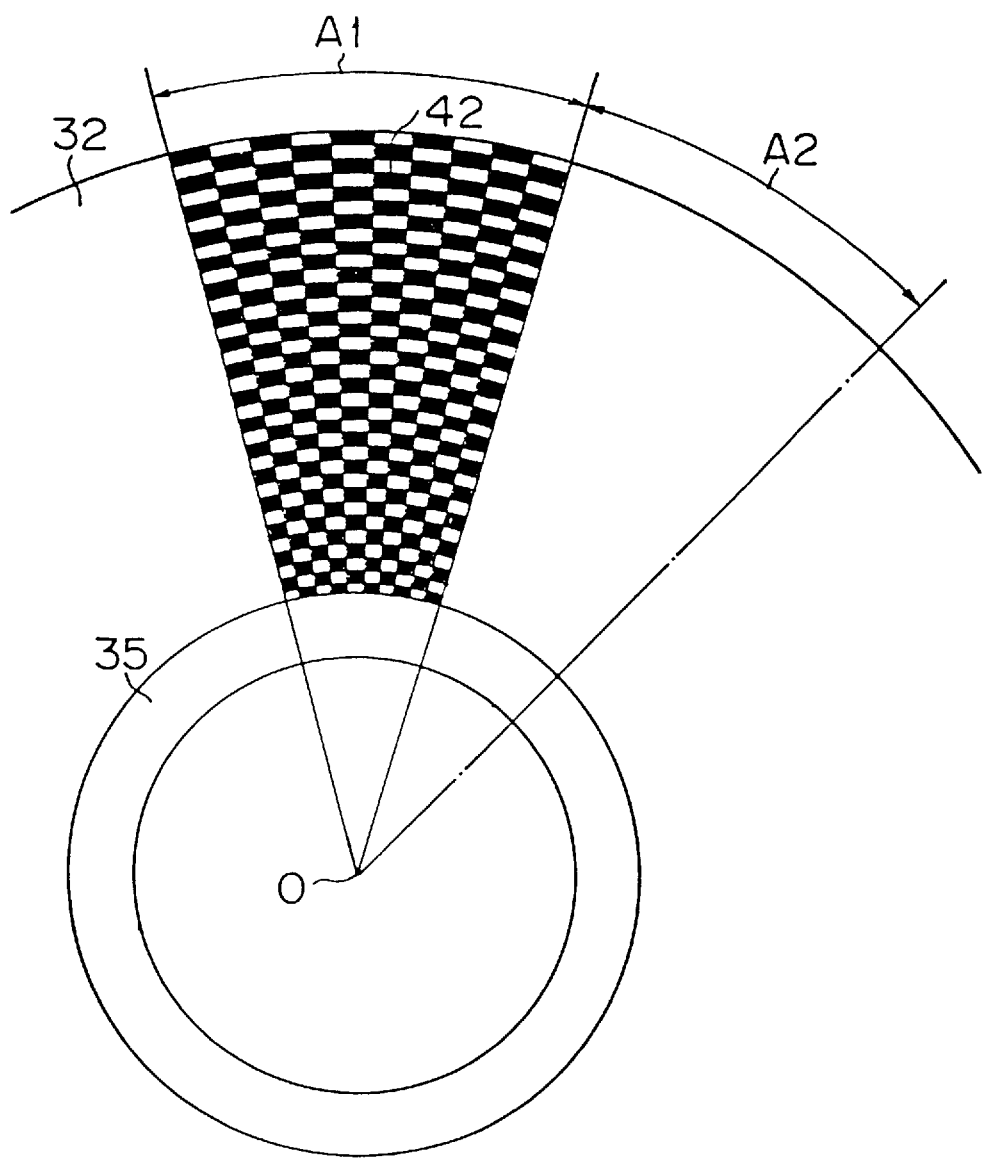
FIG. 15 is a partial plan view of a supporting plate according to the present invention, showing a still further example of a pattern of wave portions.

In FIG. 11, black portions indicate portions each protruded and curved as a convex portion as viewed from one surface side of the supporting plate 32. FIGS. 13 to 15 described later are illustrated in the same manner.

A plurality of wave portions 39 are formed by pressing as follows. Namely, as shown in FIG. 12, a plurality of wave portions 39 each extending substantially in a circumferential direction X—X of the filter and waving in a thickness direction of the filter are formed by pressing so as to be arranged substantially adjacent to each other in a radial direction Y—Y of the filter. In this embodiment, the respective adjacent wave portions 39 are substantially connected to each other. Further, the wave forms of the respective adjacent wave portions 39 shift in the circumferential direction X—X of the filter by substantially ½ pitch of one of the wave forms. This shifting of pitch is not particularly restricted, and a shift amount of, for example, ⅓ pitch or ¼ pitch may be set. In FIG. 12, "P" indicates one pitch of the wave form.

As shown in FIG. 11, a first group of wave portions 39 among the plurality of wave portions straightly are formed by pressing and they extend substantially in the circumferential direction of the filter at a constant angle relative to a radial direction of the filter passing through a center O (it is also a center of supporting plate 32) within a first region A1 of the supporting plate 32 circumferentially divided at a predetermined circumferential angle. A second group of wave portions having the same pattern as that in the first region A1 are formed by pressing within a second region of the supporting plate 32 circumferentially divided at a predetermined circumferential angle which is adjacent to the first region in the circumferential direction of the filter. This pressing is repeated in the circumferential direction of the filter and the wave portions 39 are formed over the entire circumference of the supporting plate 32.

Although the circumferential angle of each region around center O can be freely set within the range of about 10 to 90 degrees, a circumferential angle in the range of 20 to 60 degrees is preferred from the viewpoints of easiness of repeated pressing and easiness of manufacture of a die for pressing. In FIG. 11, the angle is set at about 30 degrees.

In the pattern of the wave portions shown in FIG. 11, the pitch of the wave forms of the wave portions 39 is substantially constant over the entire wave portion forming area.

Further, in the pattern of the wave portions shown in FIG. 11, because the wave portions 39 are press-formed even on the boundary between the respective adjacent circumferential regions, a convex portion or a concave portion contacting the boundary line is formed as a halfway style. Although such a state is allowed and a wave portion reaching the boundary line or a wave portion formed near the boundary line can be connected to a wave portion formed at the next adjacent circumferential region, there are the following methods in order to prevent the respective wave portions formed on the boundary line or the vicinity thereof of adjacent circumferential regions from interference.

Firstly, there is a method for providing a non-pressing band region having an appropriately small width along the boundary line. As another method, in a case where there occur convex or concave portions of wave forms over the boundary in a circumferential region, the convex or concave portions of wave forms are allowed to extend into the next adjacent circumferential region until the convex or concave portions are completed, and instead of this allowance, in the next adjacent circumferential region, the forming of convex or concave portions to be pressed in the area of the above extended convex or concave portions is stopped, that is, in the next adjacent circumferential region, the forming of the wave portions are started from a position retreated from the boundary line by the amount of the above extension of the wave forms.

Another forming pattern is shown in FIG. 13. In this forming, in a single circumferential region A1 in which wave portions are formed by one pressing using a die, the region A1 is further divided into two regions B1 and B2, and in the divided regions B1 and B2, wave portions 40a and 40b may be formed by pressing which are extended straightly substantially in the circumferential direction of the filter at different angles to each other relative to the center O. In the embodiment shown in FIG. 13, although the respective wave portions 40a and 40b are formed so as to form "╱╲" pattern relative to center O, it may be formed as a reversed "╱╲" pattern. By repeating the pressing using such a pressing die, wave portions are formed on the successive region A2, . . . in order.

In such a pattern, the polymer flow passing through the region B1 and the polymer flow passing through the region B2 in a single circumferential region A1 are naturally controlled in a symmetric and equivalent condition.

FIG. 14 shows a further forming pattern of wave portions.

In this embodiment, with respect to the pitch of the wave forms of the wave portions of a supporting plate 32, the pitch of the wave portions 41a formed in the radially outer portion of the filter and the pitch of the wave portions 41b formed in the radially inner portion are different from each other. Although the pitch of the wave portions 41b formed in the radially inner portion is greater than the pitch of the wave portions 41a formed in the radially outer portion in this embodiment, it is possible to reverse the relationship of the sizes of the pitches. Further, although the pitch change is performed at two steps in this embodiment, it is possible to set three or more steps.

In the portion of supporting plate 32 (the portion of retainer 32), because the polymer having passed through filter media 34 is gathered from the radially outer side to the radially inner side as shown in FIG. 10, the amount of the polymer becomes greater as the polymer flow approaches the innermost side. Accordingly, by setting the pitch of the wave forms of the radially inner wave portions 41b greater, the width of each path formed by the wave forms of the wave portions 41b can be set great in the radially inner portion, and thereby suppressing the resistance against the polymer flow even if the amount of the polymer flow increases in the radially inner portion.

FIG. 15 shows a further forming pattern of wave portions.

In this embodiment, a plurality of wave portions 42 concentrically extend in circumferential direction of the filter. In order to direct the polymer paths formed by the convex portions and the concave portions of the respective adjacent wave portions 42 to directions toward the center O, the pitches of the wave forms of the wave portions 42 become gradually small as approached to the center.

In such a forming pattern, the polymer flow can be directed precisely to the direction toward the center O.

Further, the pattern can be formed by pressing using a plurality of annular dies having diameters different from each other and forming the wave portions in order in the radial direction other than the aforementioned method wherein the respective circumferential regions are pressed in order in the circumferential direction. In this method, the wave portions may be formed one row by one row using the respective dies, or the wave portions may be formed by several sets of rows.

Figure 16:
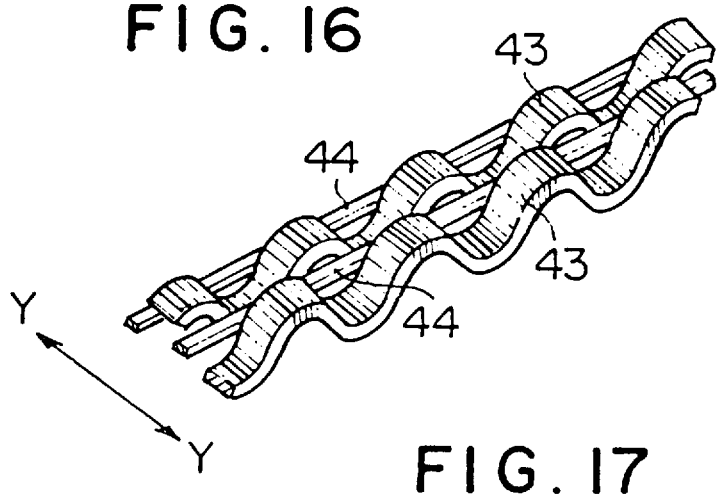
FIG. 16 is a partial perspective view of a supporting plate wherein portions which are not formed as wave forms remain between wave portions.

Further, as shown in FIG. 16, a portion 44 present between two wave portions 43, 43 substantially adjacent to each other in the radial direction Y—Y of the filter remains as a portion which does not wave. This portion 44 which does not wave extends circumferentially as a band having a small width. The width of the portion 44 is preferably in the range of 1 to 3 mm. The press-forming of the wave portions 43 to predetermined forms can be further facilitated by providing such portions 44.

Furthermore, when the wave portions are press-formed in the above respective embodiments, although they may be formed only by pressing, it is preferred that a plurality of slits are defined intermittently in the circumferential and radial directions of the annular plate for formation of a supporting plate by, for example, etching, and portions between respective pairs of slits are formed as the wave portions by pressing. Namely, preferably a pressing die functions only for providing wave forms. The wave portions can be formed at a higher accuracy by such a forming method.

Although various press-forming patterns for the wave portions can be employed as described hereinabove, the operation and advantages with respect to the embodiment shown in FIGS. 10 to 12 will be explained.

As shown in FIG. 12, polymer paths extending in the radial direction Y—Y are formed by the adjacent convex portions and concave portions of the wave portions 39 radially adjacent to each other at ½ pitch shifting. The polymer filtered by filter media 34 and having passed through filter media supporting material 33 easily flows into the supporting plate 32 from upper and lower sides as shown by arrows. Thereafter, the polymer flows easily and smoothly along the polymer paths extending in the radial direction formed as described above. Since resistance against this polymer flow in the radial direction is only the portion corresponding to the thickness of the supporting plate 32, good directability can be provided in the above direction along the polymer paths as well as the pressure loss can be suppressed as compared with that in the structure shown in FIG. 22. For example, in a case where the thickness of a supporting plate is designed to be 2.5 mm, in the present invention, it is sufficient to use a raw material plate having a thickness of 0.5 to 0.7 mm, but in the conventional structure employing a wire mesh, it is necessary to use a wire having a diameter of 1.3 to 1.5 mm. Therefore, in the present invention, the ratio of the dead volume to the total thickness can be suppressed extremely small.

Further, as shown by arrows in FIG. 12, the polymer flows along the polymer paths in the radial direction are divided and can freely flow into and out between adjacent polymer paths. The polymer flows freely into and out between adjacent polymer paths provide an excellent static mixer effect, and the polymer can be naturally and uniformly mixed during gathered toward the supporting pole 38 through the supporting plate 32. Further, if the pitch for shifting adjacent wave portions is set to ⅓ pitch or ¼ pitch, a further excellent static mixer effect can be obtained.

Furthermore, the convex portions and concave portions of the wave forms of a plurality of wave portions 39 are arranged in a staggered form as shown in FIG. 11, and a portion constituting a convex portion as viewed from one surface side forms a concave portion as viewed from the other surface side. Namely, the convex portions are arranged in a staggered form on both surface sides. These convex portions protruding from both surfaces can provide a required thickness to the supporting plate 32 as well as can form surfaces for supporting filter media supporting materials 33 disposed on both surface sides of the supporting plate.

Figure 22:
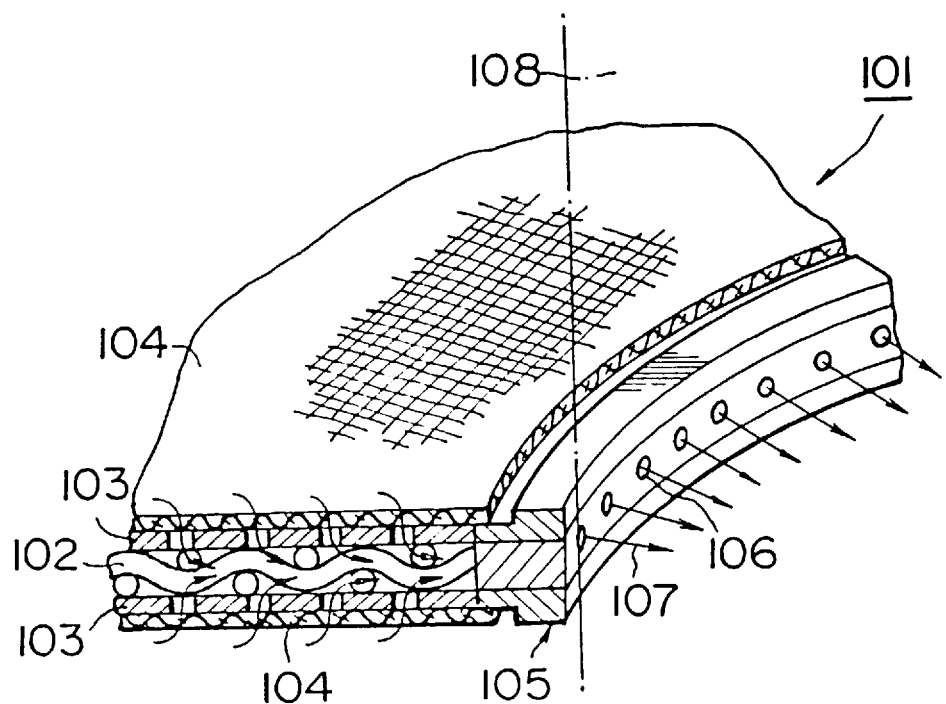
FIG. 22 is a partial perspective view of a conventional filter.

In the wire mesh type retainer 102 shown in FIG. 22, because each waving wire comes into contact with each filter media supporting material 103 substantially at a point contact, the local stress generated in the contact point is high. On the contrary, in the present invention, because each wave portion waves and has a width, the contact state with each filter media supporting material 33 is nearly line contact. Therefore, the local stress can be greatly reduced as compared with the structure shown in FIG. 22. The wave portions can hardly be deformed by a pressure loaded from upper and lower sides and can indicate an extremely high pressure resistance.

The convex portions of each wave portion 39 can indicate a high pressure resistance and the convex portions are arranged in a staggered form as shown in FIG. 11. Therefore, an extremely high pressure resistance can be indicated also as the whole of the supporting plate 32.

Further, since a plurality of wave portions 39 are formed by pressing and adjacent wave portions 39 are integrally connected to each other at any portion of the wave form, the respective wave portions 39 supplement each other in strength, thereby indicating a further high pressure resistance as the whole of the supporting plate 32.

In the press-forming patterns shown in FIG. 11 and FIGS. 13 to 15, a method for forming a predetermined pattern in order on the circumferential regions A1, A2, . . . and forming the supporting plate 32 as a integrally formed member provided with wave portions over the entire circumference is shown. However, because the supporting plate 32 prepared as a retainer is disposed inside of the filter element 31, it is possible to divide it in the circumferential direction into a plurality of members. For example, it is possible to make the circumferential regions A1, A2, . . . as separate sector members and dispose these separate sector members to complete an annular plate form.

Figure 17:
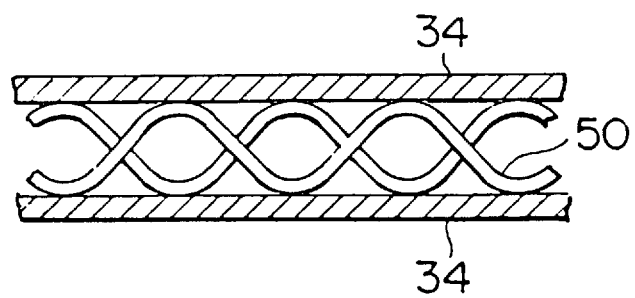
FIG. 17 is a partial, vertical sectional view of a filter element using a supporting plate according to the present invention as a filter media supporting and retainer material.

Further, although the supporting plate 32 is used as a retainer disposed at an innermost position of the filter element 31, it is possible to use it as a filter media supporting and retainer member. For example, as shown in FIG. 17, it is possible that filter media 34 are supported directly on both surfaces of a supporting plate 50 prepared as a filter media supporting and retainer member, and the member has both functions as a filter media supporting member and a retainer. Namely, since the supporting plate for a filter according to the present invention has an extremely high pressure resistance as well as has a surface form wherein a number of convex portions of the wave forms having a relatively broad contact area are densely arranged, it is possible to form an apparent flat surface having a good flatness as viewed as the whole of the supporting plate, thereby providing both functions of a filter media supporting member and a retainer to the supporting plate.

Further, the supporting plate for a filter according to the present invention can be combined with the aforementioned specified hub ring having a low pressure-loss property or can be formed integrally with the hub ring.

Figure 18:
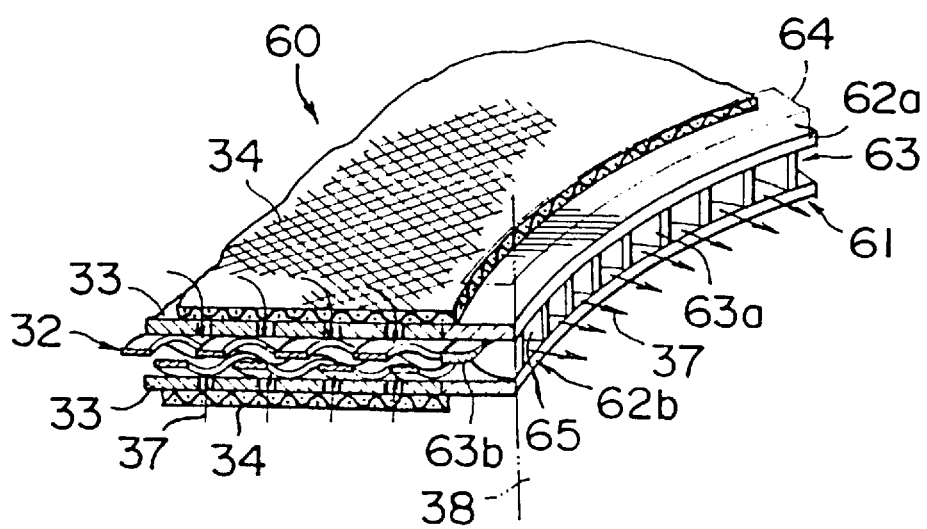
FIG. 18 is a partial perspective view of a filter element combining supporting plate and hub ring according to the present invention.

FIG. 18 shows a filter 60 in which the supporting plate 32 according to the present invention is combined with a hub ring 61 similar to that shown in FIG. 1. In FIG. 18, hub ring 61 comprises a pair of keep plates 62a and 62b disposed spacedly from each other and each formed as an annular plate, and a supporting member 63 disposed between the pair of keep plates 62a and 62b and extending annularly. In the supporting member 63, a plurality of supporting portions 63a each extending between the pair of keep plates 62a and 62b and each extending in the radial direction of the hub ring are arranged in the circumferential direction of the hub ring at an appropriate pitch. The plurality of supporting portions 63a are connected to an annular plate portion 63b at a position of the outer circumferential side of the annular arrangement of the supporting portions 63a. Label 64 indicates a spacer disposed between stacked hab rings.

Figure 19:
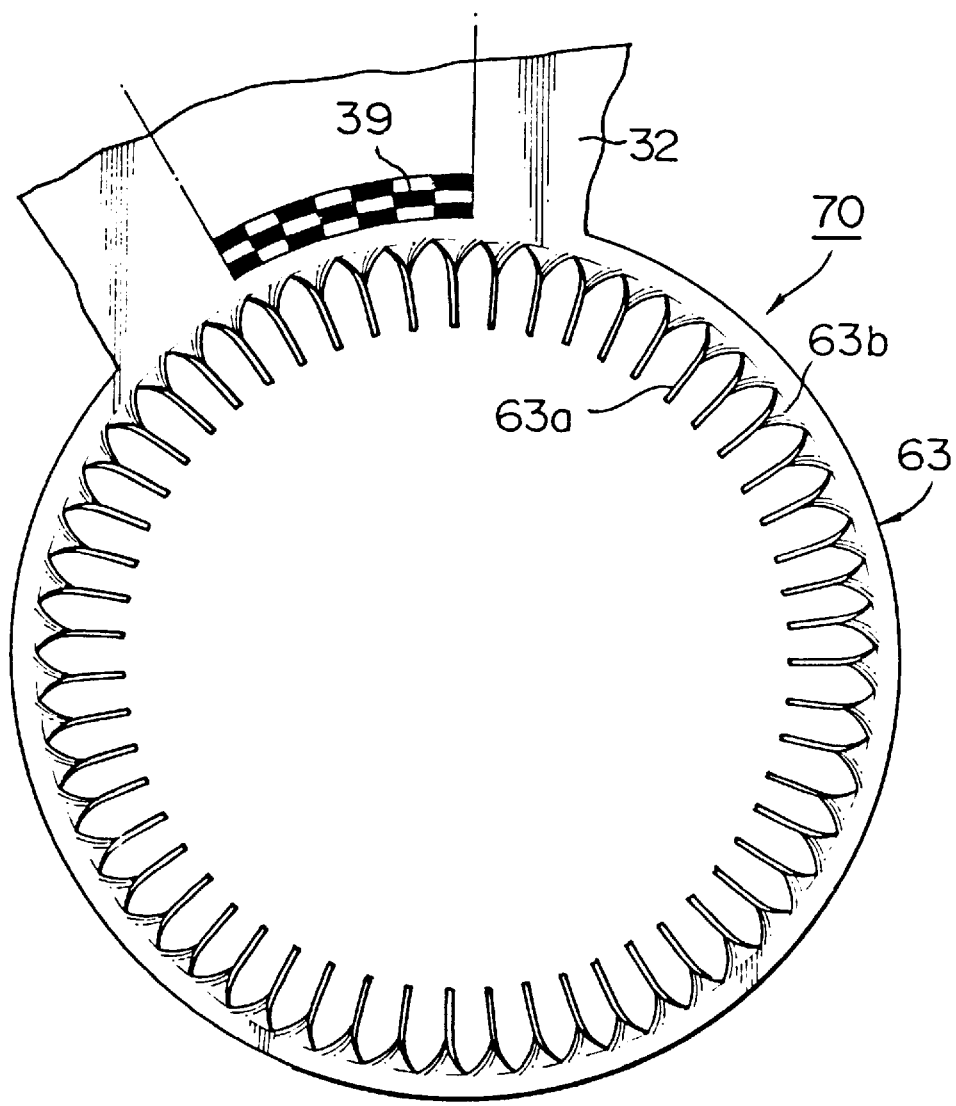
FIG. 19 is a partial plan view of integrally formed supporting plate and hub ring according to the present invention.

Such a hub ring can be manufactured in a manner similar to that aforementioned, and the advantages aforementioned can be obtained in the portion of the hub ring. Further, this hub ring portion can be integrally formed with a supporting plate according to the present invention. Namely, since an desired material is stainless steel for both members, using an annular raw material plate composed of stainless steel, for example, as shown in FIG. 19, the supporting plate 32 and the supporting member 63 of the hub ring can be integrally formed as an integral plate 70. In FIG. 19, the supporting member 63 comprising supporting portions 63a and annular plate potion 63b is integrally formed at the inner circumferential portion of the supporting plate 32 having wave portions 39. The wave portions 39 can be formed by pressing and the supporting portions 63a can be formed by twisting at an angle of 90 degrees, respectively, as aforementioned.

By such a integral forming, the number of the parts for a filter element can be reduced as well as the handling of the filter element, the assembly of the filter element and the stacking construction of a plurality of the filter elements can be facilitated.

Further, also the keep plates 62a and 62b can be substantially integrally constituted by welding them to the supporting member 63, thereby further improving the properties on assembly and handling.

Figure 20:
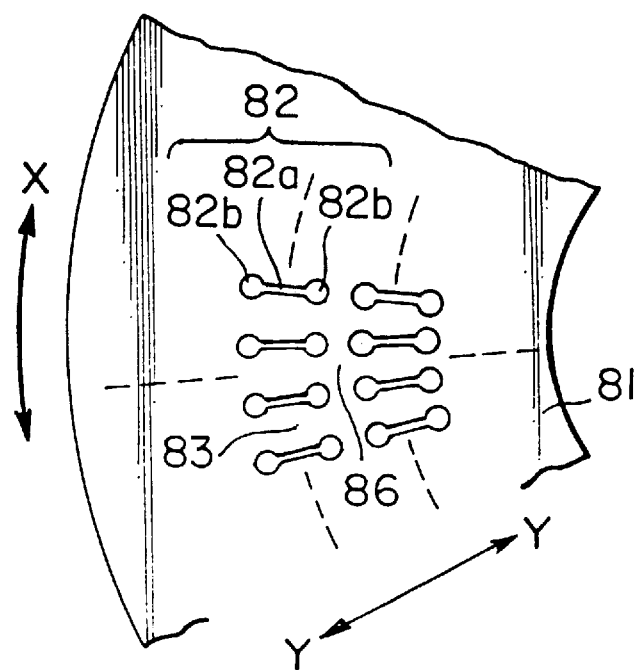
FIG. 20 is a partial plan view of an annular plate for manufacturing a supporting plate for a filter according to another embodiment of the present invention.
Figure 21:
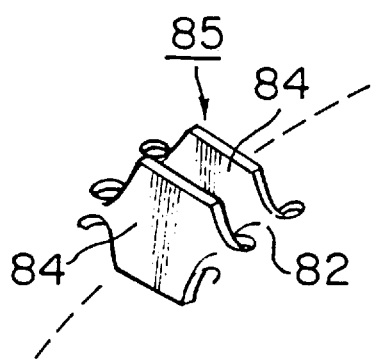
FIG. 21 is a partial perspective view of a supporting plate for a filter manufactured from the member shown in FIG. 20.

FIGS. 20 and 21 show a supporting plate for a filter according to another embodiment of the present invention and a method for manufacturing the same.

In this embodiment, as shown in FIG. 20, a plurality of slots 82 extending in a radial direction Y—Y of an annular plate 81 are defined on the annular plate 81 and arranged in the circumferential direction X—X of the annular plate 81. The annular arrangement rows are disposed in plural in the radial direction Y—Y of the annular plate 81. The portions 83 positioned between respective adjacent slots 82 are twisted substantially at an angle of 90 degrees relative to the upper and lower surfaces of the base plate portion of the annular plate 81 to form riser piece portions 84 rising perpendicularly from upper and lower surfaces of the base plate portion of the annular plate 81 at an angle of 90 degrees (FIG. 21). The riser piece portions 84 thus formed are arranged in plural in the circumferential direction X—X and the radial direction Y—Y to form a supporting plate 85 for a filter.

In this embodiment, each slot 82 has circular holes 82b at both end portions in its longitudinal direction, the circular holes 82b have a diameter greater than a width of a central portion 82a of the slot, and by this structure, twisting for forming the riser piece portions 84 can be facilitated. However, such circular holes 82b are not necessary, and a slot merely having a constant width substantially over the entire length may be employed. Further, instead of the slots, slits may be employed.

Furthermore, in a case where the riser piece portions 84 are arranged concentrically on the supporting plate 85, a ring portion 86 of the base plate portion of the supporting plate 85 positioned between radially adjacent rows of riser piece portions 84 may be waved in the thickness direction of the base plate portion. In this case, it is preferred that the heights of the riser piece portions 84 from the upper and lower surfaces of the base plate portion of the supporting plate 85 are substantially the same as the heights of a wave form of the ring portion 86 from the upper and lower surfaces of the base plate portion. By such a structure, the strength of the supporting plate 85 can be further increased, and even when the riser piece portions 84 are formed by twisting, undesired deformation of the ring portion 86 can be prevented.

In this type of supporting plate 85, stainless steel is preferred as a raw material. Further, the supporting plate 85 can be assembled with the aforementioned hub ring and, further, both members can be integrally formed.

Using such a type of supporting plate having a plurality of riser piece portions, a filter having low-pressure loss and high pressure resistance properties and a high performance can be realized.

Although several preferred embodiments of the present invention have been described in detail herein, the invention is not limited thereto. It will be appreciated by those skilled in the art that various modifications may be made without materially departing from the novel and advantageous teachings of the invention. Accordingly, the embodiments disclosed herein are by way of example. It is to be understood that the scope of the invention is not to be limited thereby, but is to be determined by the claims which follow.

What is claimed is:

1. A supporting plate provided inside of a disc-type filter having filter media at surface portions thereof comprising:

a plurality of wave portions each extending substantially in a circumferential direction of said filter, each wave portion having concave and convex portions extending in a thickness direction of said filter, said concave and convex portions being arranged along the circumferential direction of said wave portion, and said plurality of wave portions being formed by pressing to be arranged substantially adjacent to each other in a radial direction of said filter.

2. The supporting plate according to claim 1, wherein a portion present between two wave portions adjacent to each other in the radial direction of said filter is a flat portion.

3. The supporting plate according to claim 1, wherein convex and concave portions of two wave portions adjacent to each other among said plurality of wave portions shift in a circumferential direction of said filter substantially by a ½ pitch of one of said concave and convex portions.

4. The supporting plate according to claim 1, wherein wave forms of said plurality of wave portions have substantially a constant pitch over the entire area in which said plurality of wave portions are formed.

5. The supporting plate according to claim 1 wherein a pitch of a wave portion formed at a radially outer position and a pitch of a wave portion formed at a radially inner position are different from each other.

6. The supporting plate according to claim 1 wherein a first group of wave portions extend substantially straightly in the circumferential direction of said filter at a constant angle relative to a radial direction of said filter within a first region of said supporting plate circumferentially divided at a predetermined circumferential angle, and a second group of wave portions extend substantially straight in the circumferential direction of said filter at the same angle as said constant angle relative to a radial direction of said filter within a second region of said supporting plate circumferentially divided at a predetermined circumferential angle which is adjacent to said first region in the circumferential direction of said filter.

7. The supporting plate according to claim 1, wherein a first group of wave portions extend substantially straight in the circumferential direction of said filter at a constant angle relative to a radial direction of said filter within a first region of said supporting plate circumferentially divided at a predetermined circumferential angle, and a second group of wave portions extend substantially straight in the circumferential direction of said filter at an angle different from said constant angle relative to a radial direction of said filter within a second region of said supporting plate circumferentially divided at a predetermined circumferential angle which is adjacent to said first region in the circumferential direction of said filter.

8. The supporting plate according to claim 1, wherein said plurality of wave portions extend concentrically in the circumferential direction of said filter.

9. The supporting plate according to claim 1, wherein said supporting plate is constructed as an integrally formed single annular member.

10. The supporting plate according to claim 1, wherein said supporting plate is constructed from a plurality of members divided in the circumferential direction of said filter.

11. The supporting plate according to claim 1, wherein said supporting plate is constructed from a stainless steel.

12. A supporting plate provided inside of a disc-type filter having filter media at surface portions thereof comprising:

a base plate portion formed as an annular plate; and a plurality of riser piece portions disposed in radial and circumferential directions of said base plate portion, each of said plurality of riser piece portions extending in a radial direction of said base plate portion and rising from upper and lower surfaces of said base plate portion in a direction perpendicular to said base plate portion by being twisted substantially at an angle of 90 degrees relative to said base plate portion.

13. The supporting plate according to claim 12, wherein said plurality of riser piece portions are disposed concentrically on said base plate portion, and a ring portion of said base plate portion positioned between radially adjacent rows of riser piece portions has concave and convex portions extending in a thickness direction of said base plate portion.

14. The supporting plate according to claim 13, wherein the heights of said riser piece portions from the upper and lower surfaces of said base plate portion are substantially the same as the heights of a wave form of said ring portion from the upper and lower surfaces of said base plate portion.

15. The supporting plate according to claim 12, wherein said supporting plate is constructed from stainless steel.

16. An assembly of a supporting plate provided inside of a disc-type filter having filter media at surface portions thereof and a hub ring provided on at least one of inner and outer circumferences of the disc-type filter, characterized in that said supporting plate comprises:

a plurality of wave portions each extending substantially in a circumferential direction of said filter and having concave and convex portions extending in a thickness direction of said filter, said plurality of wave portions being formed by pressing so as to be arranged substantially adjacent to each other in a radial direction of said filter, and said hub ring comprising:

(a) a pair of keep plates disposed spacedly from each other and in parallel to each other, each of said pair of keep plates being formed as an annular plate; and (b) an annular supporting member disposed between said pair of keep plates, said supporting member having (i) a plurality of supporting portions disposed spacedly from each other in a circumferential direction of said hub ring, each of said plurality of supporting portions extending between said pair of keep plates in a radial direction to said hub ring and twisting about said radial direction until reaching a substantially perpendicular orientation to said pair of keep plates and (ii) an annular plate portion connected to said plurality of supporting portions.

17. The assembly of a supporting plate and a hub ring according to claim 16, wherein said annular supporting member is formed integrally with said supporting plate.

18. An assembly of a supporting plate provided inside of a disc-type filter having filter media at surface portions thereof and a hub ring provided on at least one of inner and outer circumferences of the disc-type filter, characterized in that said supporting plate comprises:

a base plate portion formed as an annular plate; and a plurality of riser piece portions disposed in radial and circumferential directions of said base plate portion, each of said plurality of riser piece portions extending in a radial direction of said base plate portion and rising from upper and lower surfaces of said base plate portion in a direction perpendicular to said base plate portion by being twisted substantially at an angle of 90 degrees relative to said base plate portion, and said hub ring comprising:

(a) a pair of keep plates disposed spacedly from each other and in parallel to each other, each of said pair of keep plates being formed as an annular plate; and (b) an annular supporting member disposed between said pair of keep plates, said supporting member having (i) a plurality of supporting portions disposed spacedly from each other in a circumferential direction of said hub ring, each of said plurality of supporting portions extending between said pair of keep plates in a radial direction to said hub ring and twisting about said radial direction until reaching a substantially perpendicular orientation to said pair of keep plates and (ii) an annular plate portion connected to said plurality of supporting portions.

19. The assembly of a supporting plate and a hub ring according to claim 18, wherein said annular supporting member is formed integrally with said supporting plate.

* * * * *